United States Patent
Al-Ateeq (10) Patent No.: US 10,406,564 B1
(45) Date of Patent: Sep. 10, 2019

(54) SORTING WASTE RECEPTACLE

(71) Applicant: Asmaa F. F. N. Al-Ateeq, Safat (KW)

(72) Inventor: Asmaa F. F. N. Al-Ateeq, Safat (KW)

(*) Notice: Subject to any disclaimer, the term of this patent is extended or adjusted under 35 U.S.C. 154(b) by 0 days.

(21) Appl. No.: 16/430,293

(22) Filed: Jun. 3, 2019

Related U.S. Application Data (63) Continuation-in-part of application No. 16/219,422, filed on Dec. 13, 2018.

(60) Provisional application No. 62/598,482, filed on Dec. 14, 2017.

(51) Int. Cl.
    *B07C 5/36*     (2006.01)
    *B07C 5/38*     (2006.01)
    *B65F 1/00*     (2006.01)

(52) U.S. Cl.
    CPC ............... *B07C 5/362* (2013.01); *B07C 5/38* (2013.01); *B07C 2501/0054* (2013.01); *B65F 1/004* (2013.01); *B65F 2001/008* (2013.01); *B65F 2210/176* (2013.01)

(58) Field of Classification Search
    CPC .......... B07C 5/16; B07C 5/122; B07C 5/342; B07C 5/362; B07C 5/38; B07C 7/005; B07C 2501/0054; B65F 1/004; B65F 1/1431; B65F 2001/008; B65F 2210/152; B65F 2210/1522; B65F 2210/1525; B65F 2210/1527; B65F 2210/168; B65F 2210/176; B65F 2210/184
    USPC ....................................................... 209/703
    See application file for complete search history.

(56) References Cited

U.S. PATENT DOCUMENTS

| | | | |
|---|---|---|---|
| 4,454,028 A | | 6/1984 | Vetter et al. |
| 5,139,205 A | * | 8/1992 | Gallagher ........... B02C 18/0007 241/101.2 |
| 5,478,186 A | * | 12/1995 | Zuidema ................. B65F 1/004 414/404 |
| 5,590,791 A | | 1/1997 | Gschweitl |

(Continued)

FOREIGN PATENT DOCUMENTS

| | | |
|---|---|---|
| CN | 203255582 U | 10/2013 |
| CN | 204161900 U | 2/2015 |

(Continued)

OTHER PUBLICATIONS

Russel et al., "Development of Automatic Smart Waste Sorter Machine," International Conference on Mechanical, Industrial and Materials Engineering, 2013, Nov. 1-3, 2013.

*Primary Examiner* — Joseph C Rodriguez
(74) *Attorney, Agent, or Firm* — Richard C. Litman (57) ABSTRACT

The sorting waste receptacle sorts and temporarily stores differing types of waste items. The sorting waste receptacle includes a hollow housing having a top wall, a bottom wall and at least one sidewall. The top wall has an opening formed therein for depositing a waste item, and a lower interior portion of the hollow housing is divided into a plurality of separate compartments, each compartment corresponding to a different type of waste. When the waste item is inserted through the opening formed in the top wall, the waste item is temporarily held within a movable chute inside the hollow housing. While in the chute, the waste item is weighed by a scale and at least one sensor determines its composition. Based on the composition of the waste item, the chute is moved above the corresponding one of the separate compartments for dispensing of the waste item therein.

17 Claims, 11 Drawing Sheets

(56) References Cited

U.S. PATENT DOCUMENTS

| | | | | |
|---|---|---|---|---|
| 5,626,240 | A * | 5/1997 | Friedrichs | B65F 1/0066 209/702 |
| 6,752,583 | B2 * | 6/2004 | Rajewski | B60P 1/36 414/502 |
| 7,454,358 | B2 * | 11/2008 | Mallett | B07C 7/005 705/308 |
| 8,322,641 | B2 * | 12/2012 | Jeon | B02C 19/0093 209/4 |
| 8,550,252 | B2 * | 10/2013 | Borowski | B65F 1/0066 209/3 |
| 9,067,245 | B2 * | 6/2015 | Hubbell | B07C 5/3412 |
| 2004/0133484 | A1 * | 7/2004 | Kreiner | B07C 5/3412 705/28 |
| 2018/0016096 | A1 * | 1/2018 | Krishnamurthy | B65F 1/1426 |

FOREIGN PATENT DOCUMENTS

| | | | |
|---|---|---|---|
| DE | 10218584 | A1 | 11/2003 |
| JP | 2002183295 | A | 6/2002 |
| WO | 2012030204 | A2 | 3/2012 |

* cited by examiner

SORTING WASTE RECEPTACLE

CROSS-REFERENCE TO RELATED APPLICATION

This application is a continuation-in-part of U.S. patent application Ser. No. 16/219,422, filed on Dec. 13, 2018, which claimed the benefit of U.S. Provisional Patent Application No. 62/598,482, filed on Dec. 14, 2017.

BACKGROUND

1. Field

The disclosure of the present patent application relates to the collection and recycling of waste, and particularly to a system for sorting and collecting waste materials, and more particularly to a sorting waste receptacle.

2. Description of the Related Art

Due to global environmental concerns, there is renewed interest in the recycling of waste, such as glass and plastic bottles, aluminum cans and the like. Although numerous local governments require the sorting of waste for recycling, the general public has long been averse to the widespread adoption of recycling, particularly due to the messy and labor-intensive process of manually sorting the waste. In order to encourage the sorting of waste for the purpose of recycling, it would obviously be desirable to provide a trash receptacle that automatically sorts the waste into different recycling categories, so that it would no longer be necessary to manually sort the waste. Thus, a sorting waste receptacle solving the aforementioned problems is desired.

SUMMARY

The sorting waste receptacle sorts and temporarily stores differing types of waste items. The sorting waste receptacle includes a hollow housing having a top wall, a bottom wall and at least one sidewall extending between the top wall and the bottom wall. The top wall has an opening formed therethrough for receiving a waste item, and a lower interior portion of the hollow housing is divided into a plurality of separate compartments, each compartment corresponding to a different type of waste. When the waste item is inserted through the opening formed in the top wall, the waste item is temporarily held within a movable, hollow chute inside the hollow housing. While in the hollow chute, the waste item is weighed by a scale and at least one sensor determines its composition. Based on the composition of the waste item, the hollow chute is moved above the corresponding one of the separate compartments for dispensing of the waste item therein.

In order to perform the automatic sorting and moving of the chute, a frame is mounted in an upper interior portion of the hollow housing. The frame includes longitudinally opposed front and rear walls, a pair of laterally opposed, longitudinally extending upper members secured to and extending between upper ends of the longitudinally opposed front and rear walls, and a pair of laterally opposed, longitudinally extending lower members secured to, and extending between, lower ends of the longitudinally opposed front and rear walls. Each of the longitudinally extending upper members has a longitudinally extending slot formed therethrough, and similarly, each of the longitudinally extending lower members also has a longitudinally extending slot formed therethrough.

A sliding support or trolley is slidably mounted to the frame for supporting the hollow chute. The sliding support includes a pair of longitudinally opposed, laterally extending upper members extending between the pair of laterally opposed, longitudinally extending upper members of the frame, and a pair of longitudinally opposed, laterally extending lower members extending between the pair of laterally opposed, longitudinally extending lower members of the frame. The pair of longitudinally opposed, laterally extending upper members respectively slidably engage the longitudinally extending slots of the pair of laterally opposed, longitudinally extending upper members of the frame, such that the pair of longitudinally opposed, laterally extending upper members are selectively longitudinally movable within the frame. Similarly, the pair of longitudinally opposed, laterally extending lower members respectively slidably engage the longitudinally extending slots of the pair of laterally opposed, longitudinally extending lower members of the frame, such that the pair of longitudinally opposed, laterally extending lower members are selectively longitudinally movable within the frame.

The hollow chute mounted on the sliding support has opposed upper and lower ends and, through its mounting on the sliding support, is selectively positionable longitudinally and laterally in the frame. The upper end of the hollow chute is adapted for receiving the waste item from the opening formed through the top wall of the hollow housing. The lower end of the hollow chute is adapted for dispensing the waste item into a selected one of the plurality of separate compartments in the lower interior portion of the hollow housing. At least one sensor, such as a capacitive sensor or the like, is mounted on the frame for determining the composition of the waste item. The selected one of the plurality of separate compartments is determined based on the composition of the waste item.

These and other features of the present disclosure will become readily apparent upon further review of the following specification and drawings.

DETAILED DESCRIPTION OF THE PREFERRED EMBODIMENTS

Figure 1:
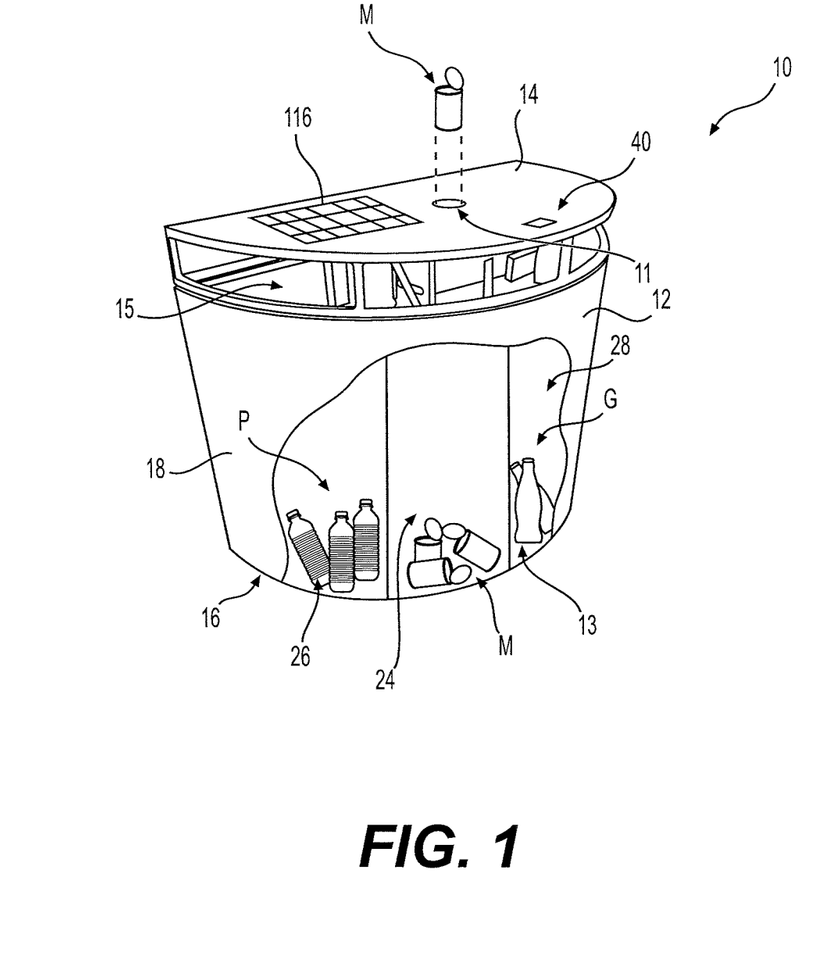
FIG. 1 is a perspective view of a sorting waste receptacle, partially cut-away to show separate compartments for sorted waste in the lower portion of the interior of the receptacle.

The sorting waste receptacle 10 automatically sorts and temporarily stores differing types of waste items. As shown in FIG. 1, the sorting waste receptacle 10 includes a hollow housing 12 having a top wall 14, a bottom wall 16 and at least one sidewall 18. It should be understood that the dimensions and configuration of the hollow housing 12 are shown in FIG. 1 for exemplary purposes only. The top wall 14 has an opening 11 formed therethrough for receiving a waste item, such as exemplary aluminum can M. The hollow housing 12 has a lower interior portion 13 and an upper interior portion 15. The lower interior portion 13 is divided into a plurality of separate compartments 24, 26, 28, each compartment corresponding to a different type of waste, particularly to a different class of recyclable waste. In the example of FIG. 1, compartment 24 is configured for receiving metal waste M (such as cans and the like), compartment 26 is configured for receiving plastic waste P (such as plastic water bottles and the like), and compartment 28 is configured for receiving glass waste G (such as glass bottles and the like).

Figure 2A:
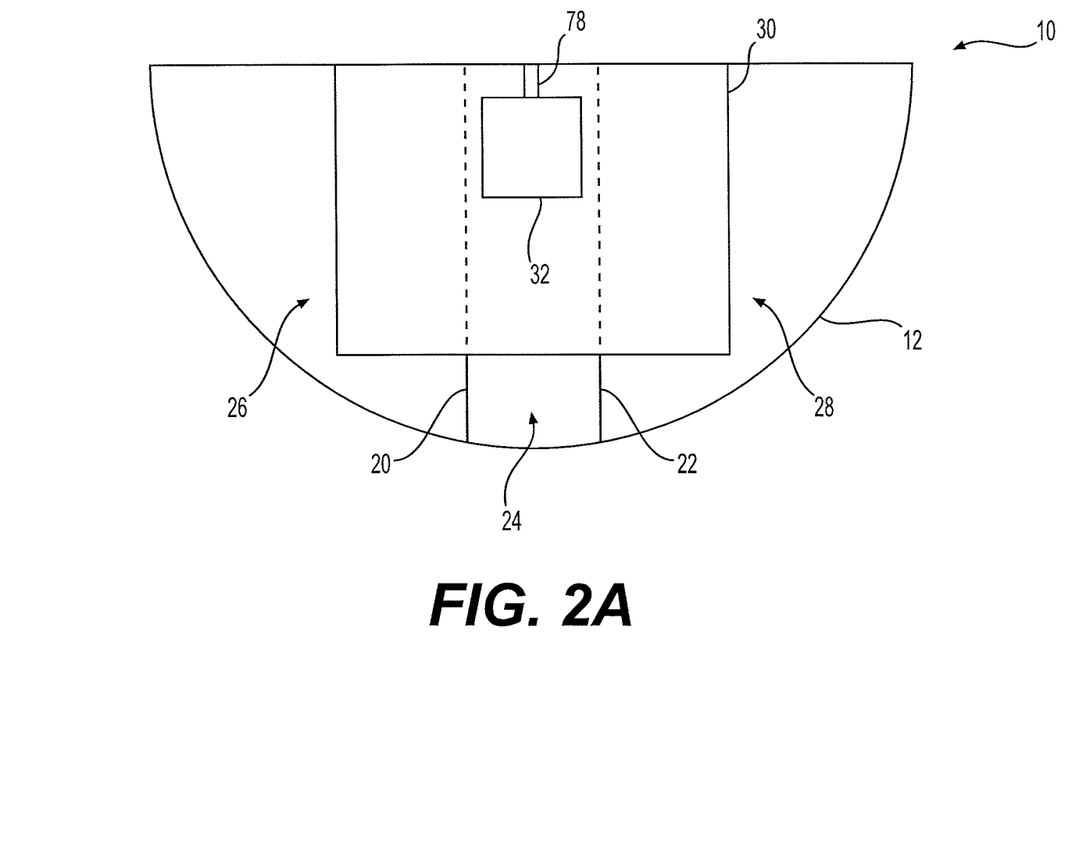
FIG. 2A, FIG. 2B, FIG. 2C and FIG. 2D are schematic diagrams illustrating sorting waste between the three lower compartments of the sorting waste receptacle.
Figure 2B:
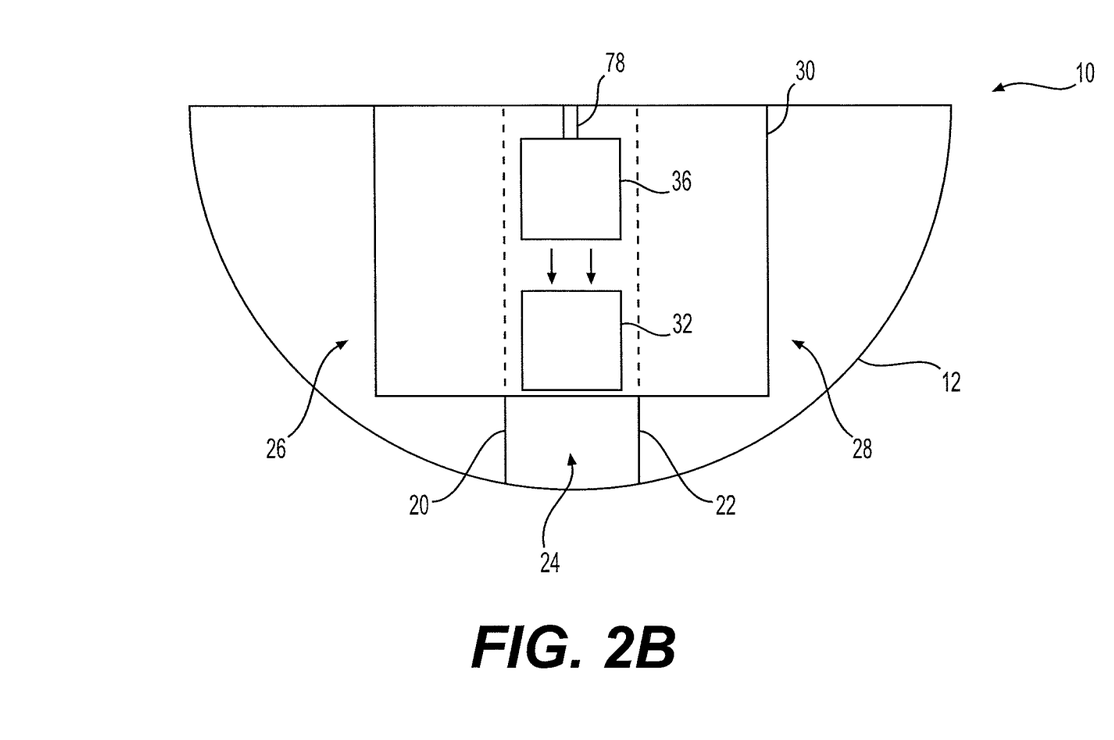
Figure 2C:
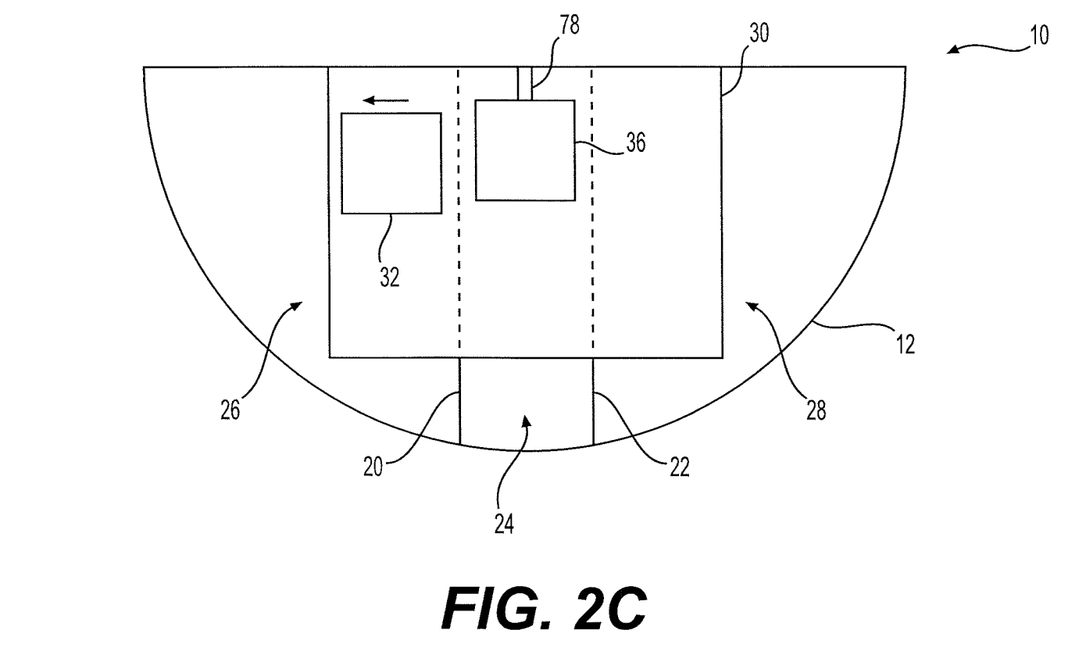
Figure 2D:
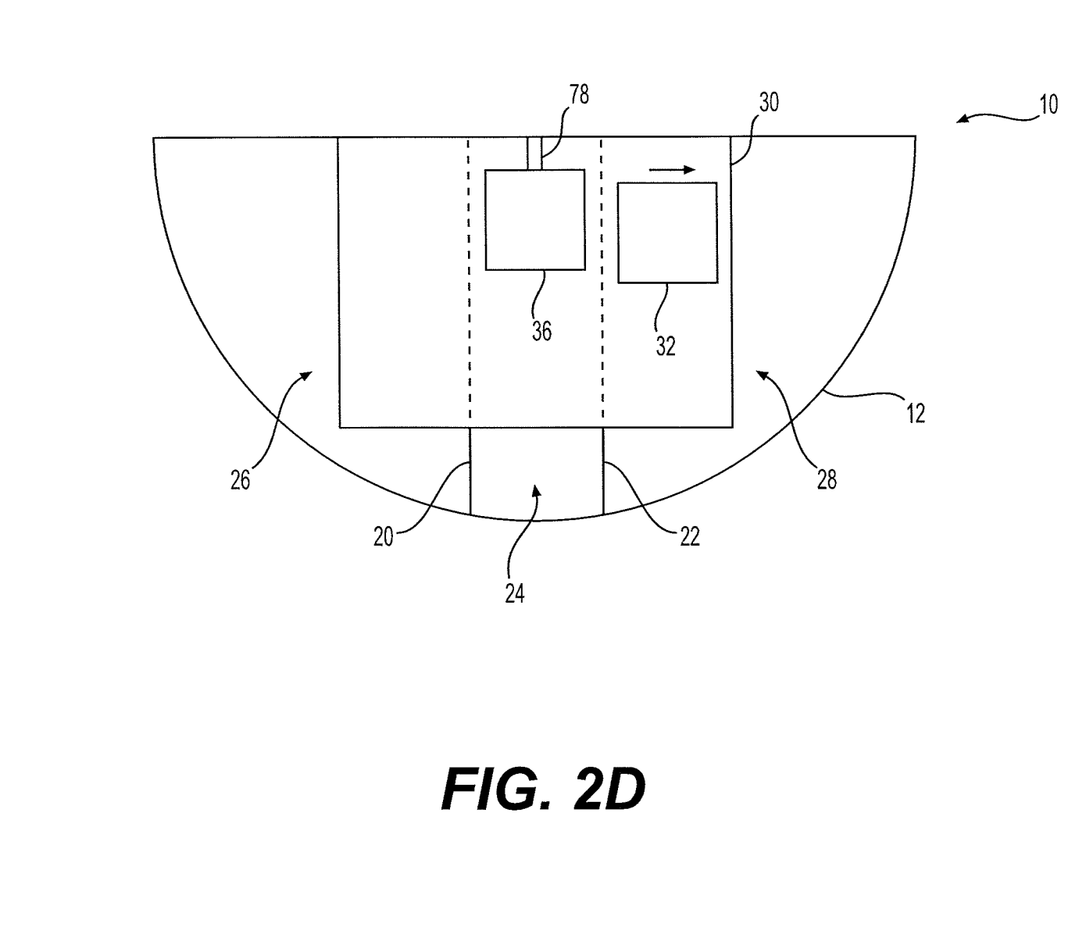
Figure 3A:
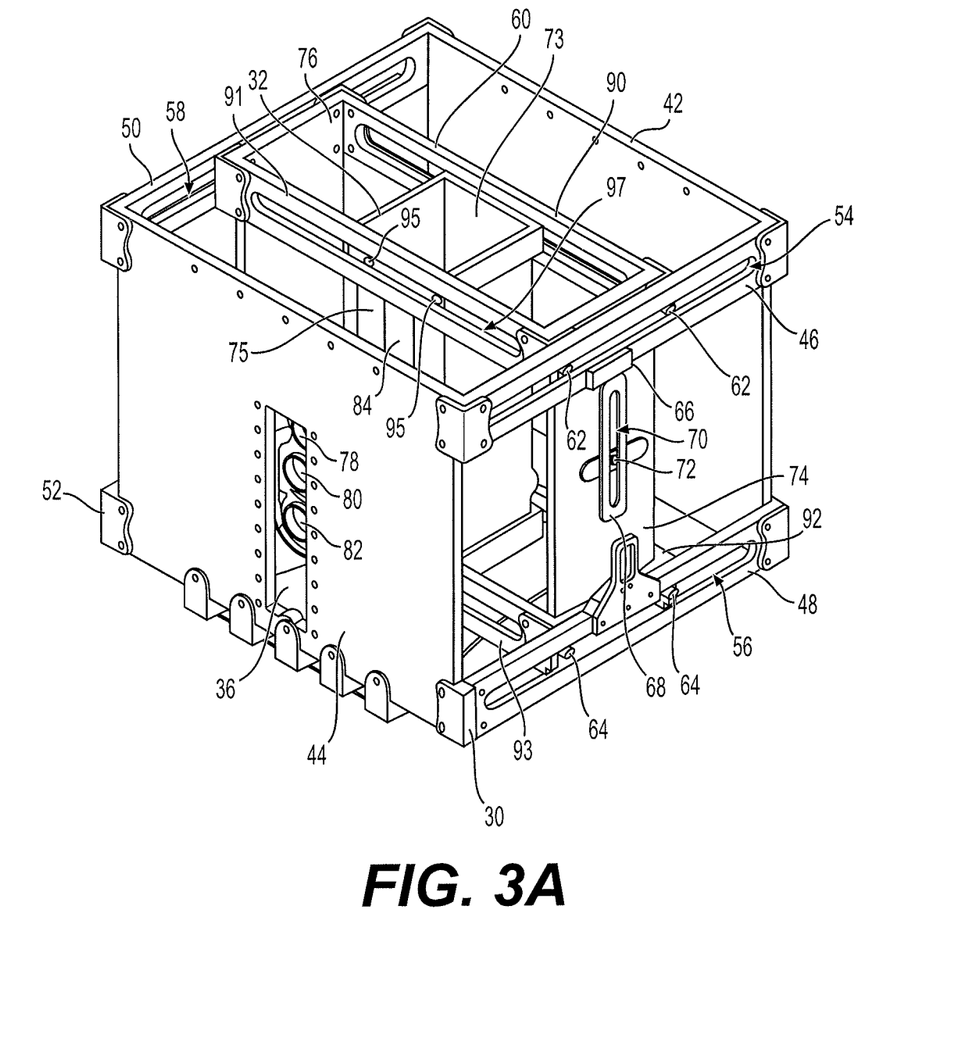
FIG. 3A is a perspective view of an internal frame, sliding support and hollow chute of the sorting waste receptacle.
Figure 3B:
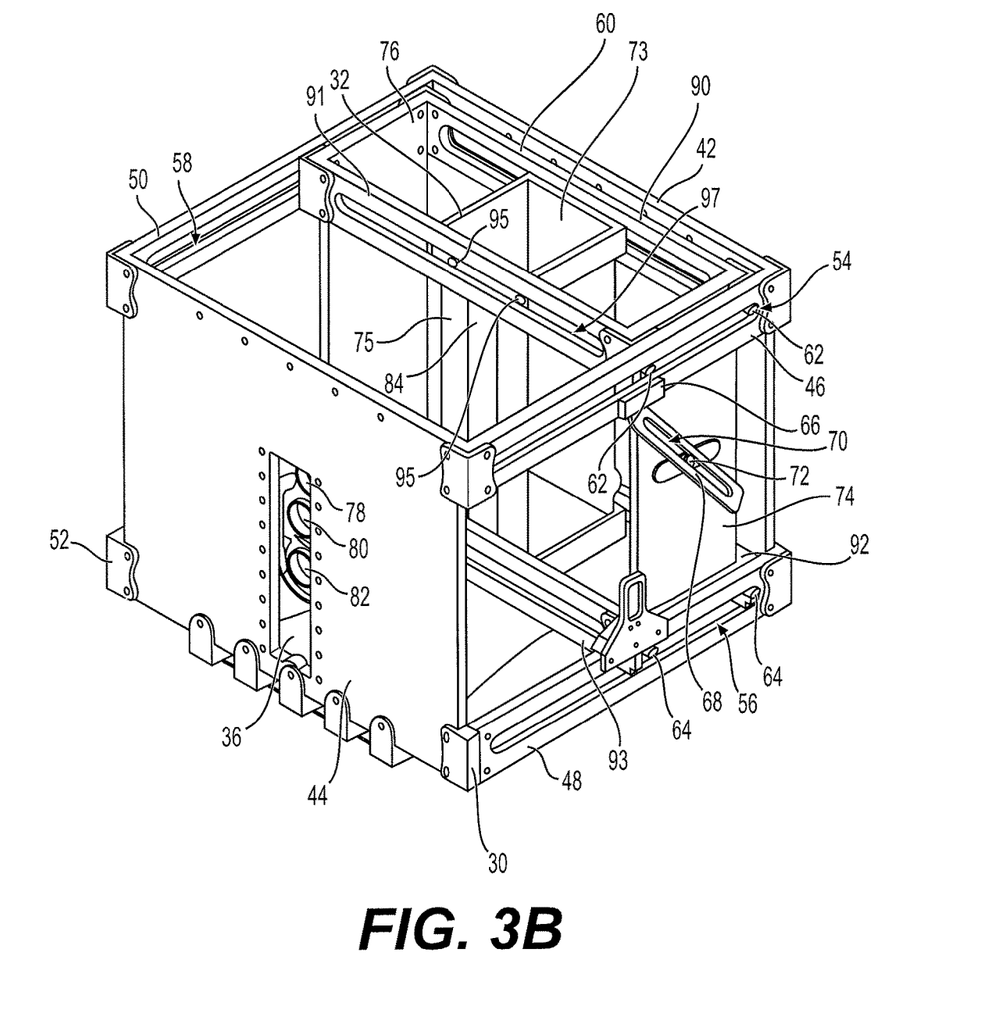
FIG. 3B is a perspective view of the internal frame, sliding support and hollow chute of FIG. 3A, shown with the hollow chute in a first longitudinal position.
Figure 3C:
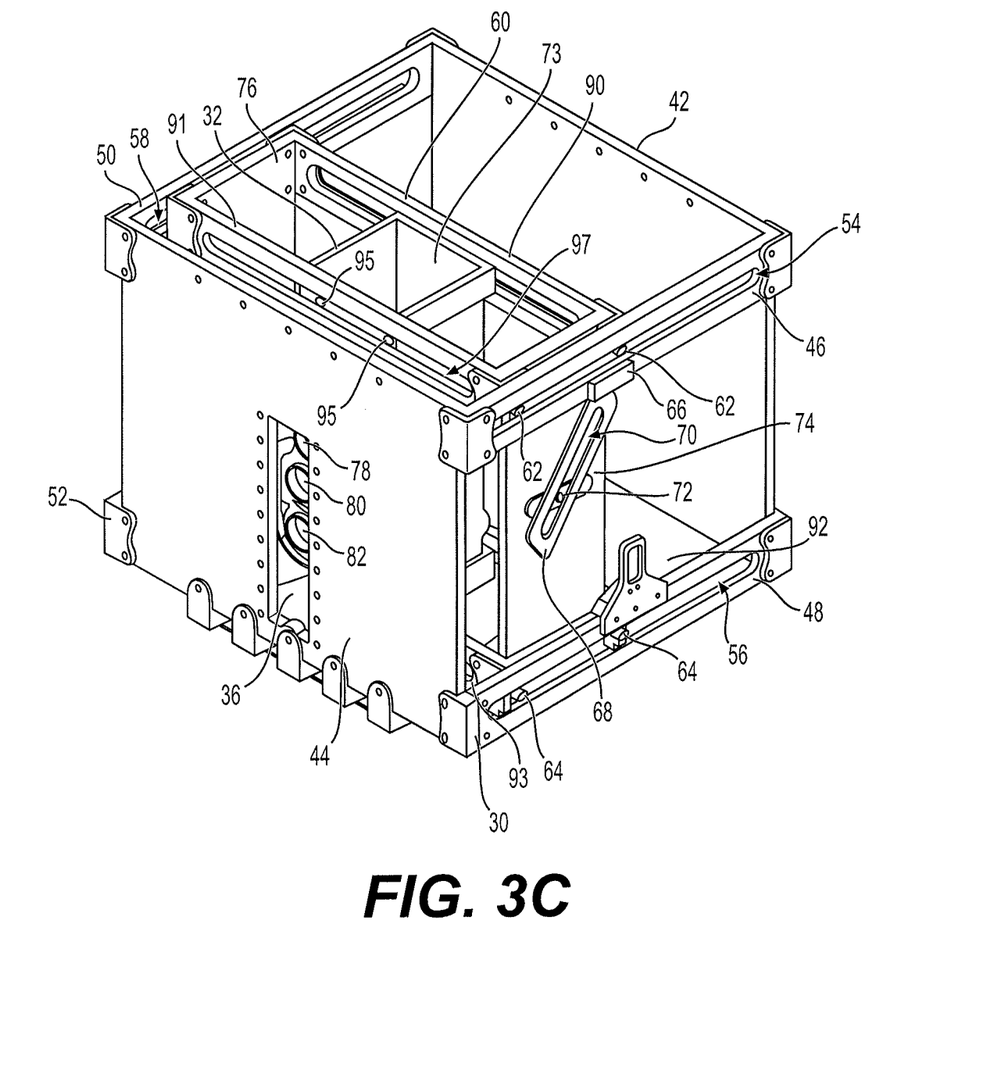
FIG. 3C is a perspective view of the internal frame, sliding support and hollow chute of FIG. 3A, shown with the hollow chute in a second longitudinal position.
Figure 4:
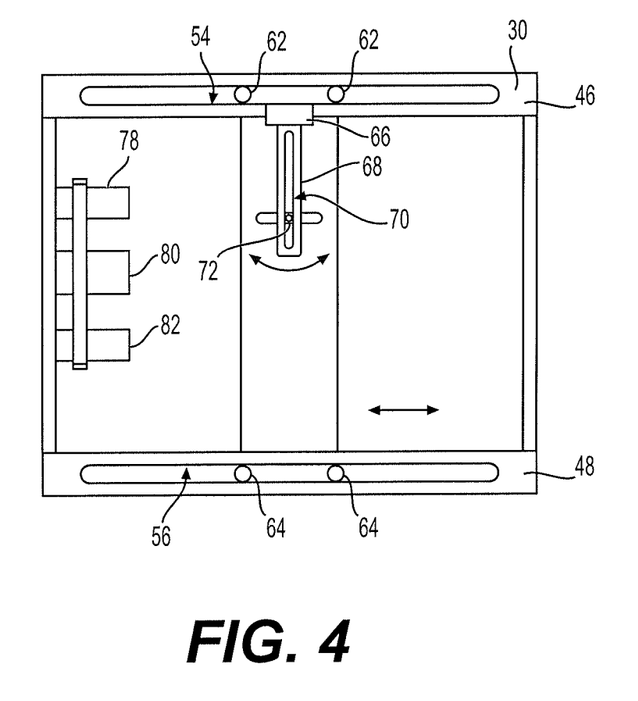
FIG. 4 is a side view of the internal frame, sliding support and hollow chute of FIGS. 3A-3C.

When the waste item is inserted through the opening 11, the waste item is temporarily held within a movable, hollow chute 32 (shown in FIGS. 3A-3C) inside the hollow housing 12. As illustrated in FIGS. 2A-2D, while in the hollow chute 32, the waste item is weighed by a scale 36, and at least one sensor 78 determines its composition, or at least what recycling class (e.g., plastic, metal, glass, etc.) the waste item should be sorted into. Based on the composition of the waste item, the hollow chute 32 is moved above the corresponding one of the separate compartments 24, 26, 28 for dispensing of the waste item therein. As an example, as shown in FIGS. 3A and 4, three such sensors 78, 80, 82 may be provided. Sensor 78 may be a capacitive sensor or the like, configured for detecting glass. Sensor 80 may be a capacitive sensor or the like, configured for detecting plastic. Sensor 82 may be a capacitive sensor or the like, configured for detecting metal. If, for example, sensor 82 detects that the waste item is metal waste M, the chute 32 is moved to drop the waste item into compartment 24, as illustrated diagrammatically in FIG. 2B. As shown in FIG. 2A, the chute 32 starts on scale 36, to weigh the waste item, and then moves to the appropriate position. Similarly, if sensor 80 detects that the waste item is plastic waste P, the chute 32 is moved to drop the waste item into compartment 26, as illustrated diagrammatically in FIG. 2C. If sensor 78 detects that the waste item is glass waste G, the chute 32 is moved to drop the waste item into compartment 28, as illustrated diagrammatically in FIG. 2D.

In order to perform the automatic sorting and moving of the hollow chute 32, a frame 30 or trolley frame is mounted in the upper interior portion 15 of the hollow housing 12. As shown in FIGS. 3A-3C, the frame 30 includes longitudinally opposed front and rear walls 42, 44, respectively, a pair of laterally opposed, longitudinally extending upper members 46, 50 extending between upper ends of the longitudinally opposed front and rear walls 42, 44, and a pair of laterally opposed, longitudinally extending lower members 48, 52 extending between lower ends of the longitudinally opposed front and rear walls 42, 44. Each of the longitudinally extending upper members 46, 50 has a longitudinally extending slot 54, 58, respectively, formed therethrough, and similarly, each of the longitudinally extending lower members 48, 52 also has a longitudinally extending slot formed therethrough. In the orientation of FIGS. 3A and 4, only slot 56 can be seen extending through the lower member 48, although it should be understood that a similar slot is formed through lower member 52.

A sliding support 60 or trolley is slidably mounted in the frame 30 for supporting the hollow chute 32. The sliding support 60 includes a pair of longitudinally opposed, laterally extending upper members 90, 91 extending between the pair of laterally opposed, longitudinally extending upper members 46, 50 of the frame 30, and a pair of longitudinally opposed, laterally extending lower members 92, 93 extending between the pair of laterally opposed, longitudinally extending lower members 48, 52 of the frame 30. The pair of longitudinally opposed, laterally extending upper members 90, 91 slidably engage the longitudinally extending slots 54, 58 of the pair of laterally opposed, longitudinally extending upper members 46, 50, such that the pair of longitudinally opposed, laterally extending upper members 90, 91 are selectively longitudinally movable within the frame 30. Exemplary rollers 62 are shown being received within slot 54, and it should be understood that a similar pair of rollers may be received within slot 58. It should be further understood that rollers 62 are shown for exemplary purposes only, and that any suitable type of wheels, rollers, bearings or the like may be used for sliding the pair of longitudinally opposed, laterally extending upper members 90, 91 within the slots 54, 58.

Similarly, the pair of longitudinally opposed, laterally extending lower members 92, 93 respectively slidably engage the longitudinally extending slots (only slot 56 shown, the opposing lower slot being symmetrical) of the pair of laterally opposed, longitudinally extending lower members 48, 52 of the frame 30, such that the pair of longitudinally opposed, laterally extending lower members 48, 52 are selectively longitudinally movable within the frame 30. Exemplary rollers 64 are shown being received within slot 56, and it should be understood that a similar pair of rollers may be received within the laterally opposed slot. It should be further understood that rollers 64 are shown for exemplary purposes only, and that any suitable type of wheels, rollers, bearings or the like may be used.

The hollow chute 32 mounted on the sliding support 60 has opposed upper and lower ends and, through its mounting on sliding support 60, is selectively positionable longitudinally and laterally in the frame 30. The upper end of the hollow chute 32 is open or otherwise adapted for receiving the waste item from the opening 11 formed through the top wall 14 of the hollow housing 12. The lower end of the hollow chute 32 is open or otherwise adapted for dispensing the waste item into a selected one of the plurality of separate compartments 24, 26, 28 in the lower interior portion 13 of the hollow housing 12. The selected one of the plurality of separate compartments 24, 26, 28 is determined based on the composition of the waste item (i.e., the recycling class of the waste item) as detected by sensors 78, 80, 82. As shown in FIG. 3A, the hollow chute 32 may have opposed front and rear walls 73, 75, respectively, and a slot 84 may be formed through the rear wall 75. This provides for direct access of the waste item by sensors 78, 80, 82 when hollow chute 32 is in the position of FIG. 2A, i.e., when the hollow chute 32 is positioned above scale 36, which is mounted on the lower end of frame 30. Scale 36 not only weighs the waste item, but also prevents the waste item from falling into one of the compartments 24, 26, 28 before hollow chute 32 is moved into the desired position.

Figure 6:
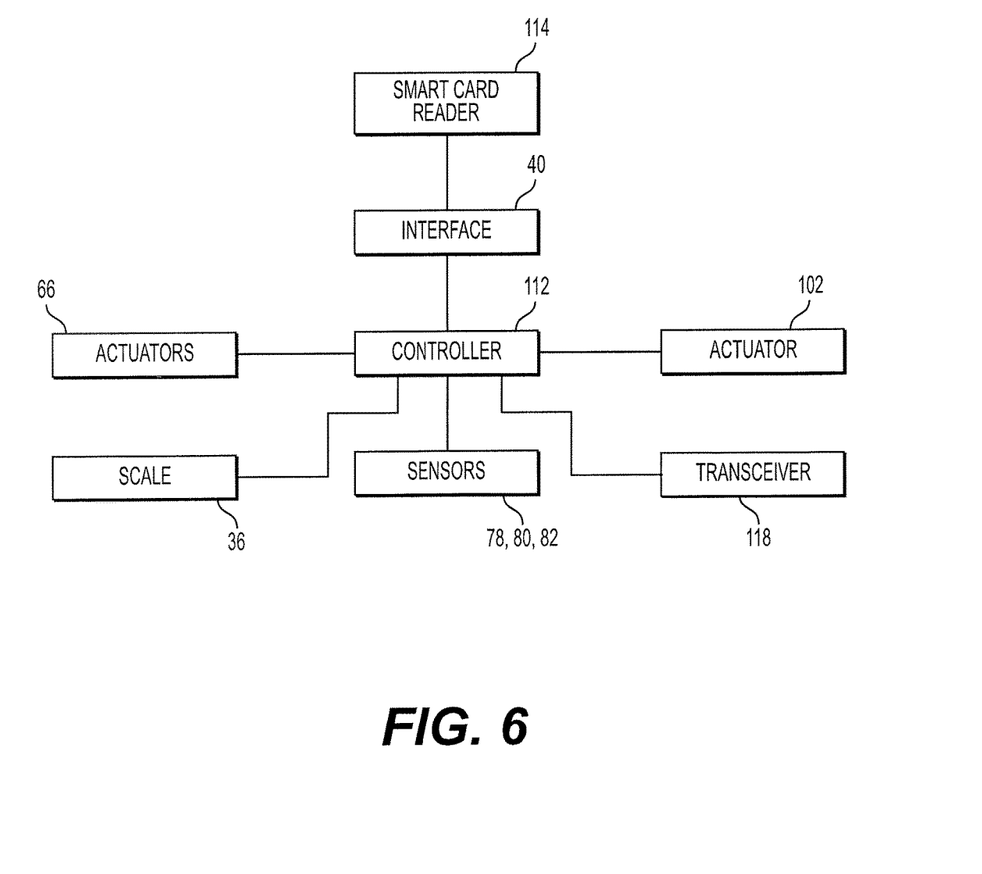
FIG. 6 is a block diagram of a control system of the sorting waste receptacle.

As shown in FIG. 6, a controller 112 is preferably mounted within hollow housing 12. Controller 112 may be a microprocessor, a microcontroller, a programmable logic controller, a processor such as that commonly associated with a personal computer, or the like. Sensors 78, 80, 82 are in communication with the controller 112, allowing controller 112 to send actuation signals, as will be described in greater detail below, to selectively move hollow chute 32. Controller 112 may be supplied with power from any suitable source, such as one or more solar panels 116 (shown in FIG. 1) mounted on the hollow housing 12. Controller 112 may be accessed through an interface 40, such as a touchscreen interface or the like, and may further be accessible through a transceiver 118, such as a Wi-Fi transceiver or the like, providing communication with an external server or with a user through a portable device, such as a smartphone. Further, as shown, scale 36 may be in communication with controller 112 for receiving and recording the weight of the waste item.

As shown in FIGS. 3A-3C, the sliding support 60 may have a pair of laterally opposed sidewalls 74, 76. In the orientation of FIGS. 3A and 4, a first actuator 66 is mounted on the frame 30, adjacent sidewall 74. It should be understood that a similar actuator may also be mounted laterally opposite actuator 66, adjacent sidewall 76. In FIGS. 3A and 4, the first actuator 66 is shown mounted to the upper member 46, although it should be understood that, alternatively, the first actuator 66 could be mounted on the lower member 48. A first end of a pivoting bar 68 is mounted on the first actuator 66 for selective pivoting of the first pivoting bar 68. A slot 70 is formed through the first pivoting bar 68 for receiving a first peg 72, which is mounted on sidewall 74. It should be understood that a similar pivoting bar and peg may be provided laterally opposite, corresponding to the laterally opposed sidewall 76. As shown in FIGS. 3B and 3C, selective pivoting of the first pivoting bar 68 drives the sliding support 60 to selectively longitudinally slide with respect to the frame 30, either toward front wall 42 (FIG. 3B) or toward rear wall 44 (FIG. 3C).

Figure 5:
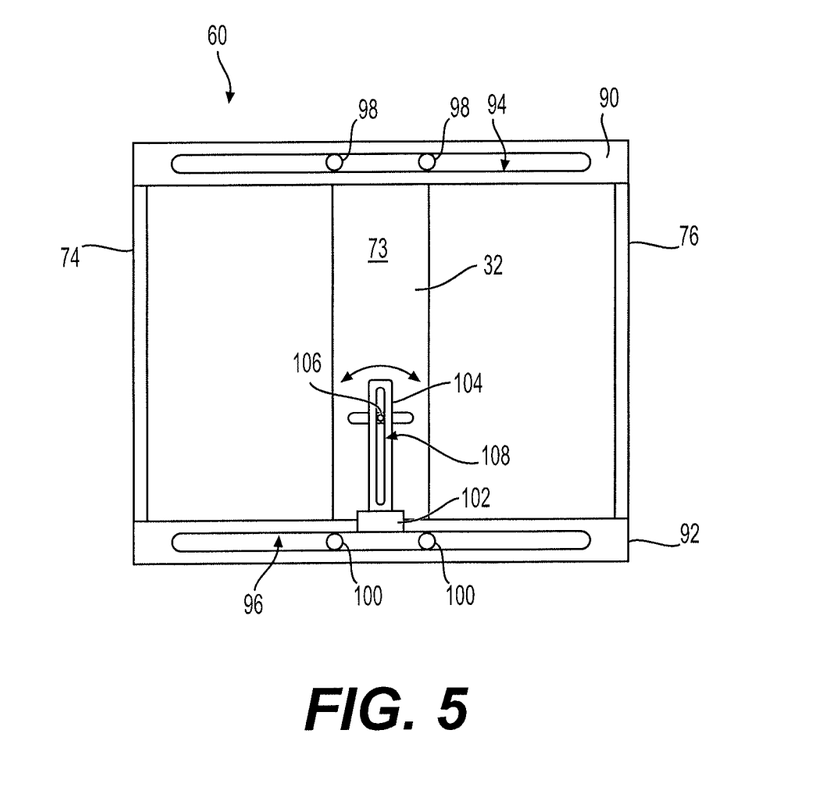
FIG. 5 is a front view of the sliding support and hollow chute of the sorting waste receptacle.

The hollow chute 32 is driven to move in the lateral direction in a similar manner. As shown in FIG. 5, at least one second actuator 102 is provided for imparting lateral movement to the hollow chute 32. It should be understood that first and second actuators 66, 102 may be any suitable type of rotational or pivotal actuator, such as a servo motor or the like. Further, although second actuator 102 is shown mounted on lower member 92 in FIG. 5, it should be understood that second actuator 102 could, alternatively, be mounted on upper member 90 of sliding support 60.

A first end of a second pivoting bar 104 is mounted on the second actuator 102 for selective pivoting of the second pivoting bar 104. A slot 108 is formed through the second pivoting bar 104. Similar to the longitudinal movement of the sliding support 60, as described above, lateral movement of the hollow chute 32 is effected by second peg 106, which is mounted on the front wall 73 of the hollow chute 32, engaging slot 108, such that selective pivoting of the second pivoting bar 104 drives the hollow chute 32 to selectively laterally slide with respect to the sliding support 60. As shown in FIG. 6, controller 112 is in communication with the first actuators 66 and the second actuator 102 for delivering control signals thereto.

In FIG. 5, exemplary rollers 98 are shown being received within slot 94 formed through laterally extending upper member 90 and, similarly, in FIG. 3A, exemplary rollers 95 are shown received within slot 97 formed through laterally extending upper member 91. Similarly, as shown in FIG. 5, exemplary rollers 100 are shown received within slot 96 of laterally extending lower member 92, and it should be understood that a similar pair of rollers may be received within the longitudinally opposed slot formed through laterally extending lower member 93. It should be further understood that rollers 95, 98, 100 are shown for exemplary purposes only, and that any suitable type of wheels, rollers, bearings or the like may be used.

In use, in order to encourage consumers to recycle, controller 112 may assign points, based on the weight measured by scale 36, for each deposit of waste into the sorting waste receptacle 10. For example, one kilogram of plastic waste P could result in a user gaining twenty points in a consumer personal account. Transceiver 118 can be used to transmit such scores to an external server or to a user's mobile device. Alternatively, a smart card reader 114 or the like could be provided, allowing the user to scan or insert a personal smart card, thus registering the user (and linking to the user's personal account), and recording the point value on the smart card. The points may later be redeemed for currency or be used to purchase goods or services. The hollow housing 12 may be equipped with a locking system, preventing unauthorized removal of waste therefrom.

It is to be understood that the sorting waste receptacle is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A sorting waste receptacle, comprising:
   a hollow housing having a top wall, a bottom wall and at least one sidewall extending between the top wall and the bottom wall, the top wall having an opening formed therein for depositing a waste item into the hollow housing, the hollow housing having an upper interior portion and having a lower interior portion, the lower interior portion being divided into a plurality of separate compartments;
   a frame mounted in the upper interior portion of the hollow housing, the frame including:
      longitudinally opposed front and rear walls, the front and rear walls each having an upper end and a lower end;
      a pair of laterally opposed upper members extending between the upper ends of the front and rear walls, each of the upper members having a longitudinally extending slot defined therein; and
      a pair of laterally opposed lower members extending between the lower ends of the front and rear walls, each of the lower members having a longitudinally extending slot defined therein;
   a sliding support slidably mounted in the frame, the sliding support including:
      a pair of laterally extending upper members extending between the upper members of the frame, the upper members of the sliding support slidably engaging the longitudinally extending slots defined in the upper members of the frame; and
      a pair of lower members extending between the lower members of the frame, the lower members of the sliding support slidably engaging the longitudinally extending slots defined in the lower members of the frame, whereby the sliding support is selectively movable from front to rear within the frame;

a hollow chute mounted on the sliding support, the chute having opposed upper and lower ends and being selectively positionable laterally within the sliding support, the upper end of the chute being open for receiving the waste item from the opening formed through the top wall of the hollow housing, the lower end being open for dispensing the waste item into a selected one of the plurality of separate compartments in the lower interior portion of the hollow housing; and at least one sensor mounted on the frame for determining a recycling class of the waste item, the plurality of separate compartments in the lower portion of the hollow housing being separated according to the recycling classes of the waste items determined by the at least one sensor for sorting recyclable waste items, the sliding support being selectively moved front to rear within the frame and the chute being selectively positioned laterally in the sliding support to position the chute above the selected one of the compartments in the lower interior portion of the hollow housing.

2. The sorting waste receptacle as recited in claim 1, wherein the sliding support further comprises a pair of laterally opposed sidewalls extending between the upper and lower members of the sliding support.

3. The sorting waste receptacle as recited in claim 2, further comprising:
   at least one first actuator mounted on the frame; and
   at least one first pivoting bar having a first end and an opposed free second end, the first end being pivotally mounted on the at least one first actuator for selective pivoting of the at least one first pivoting bar, the at least one first pivoting bar having a slot defined therein, at least one of the sidewalls of said sliding support having a peg extending therefrom through the slot defined in the at least one first pivoting bar;
   whereby selective pivoting of the at least one first pivoting bar drives the sliding support to selectively slide forward and rearward in the frame.

4. The sorting waste receptacle as recited in claim 3, further comprising:
   at least one second actuator mounted on the sliding support; and
   at least one second pivoting bar having a second free end and an opposing first end, the first end being pivotally mounted on the at least one second actuator for selective pivoting of the at least one second pivoting bar, the at least one second pivoting bar having a slot defined therein, the chute having at least one second peg extending therefrom through the slot defined in the at least one second pivoting bar;
   whereby selective pivoting of the at least one second pivoting bar drives the chute to selectively slide laterally in the sliding support.

5. The sorting waste receptacle according to claim 4, further comprising a controller connected to said at least one sensor, said at least one first actuator, and said at least one second actuator, the controller being configured to drive said at least one first actuator to move said sliding support forward and rearward in said frame and to drive said at least one second actuator to move said chute laterally above the selected one of the compartments in the lower interior portion of the hollow housing in response to a signal from said at least one sensor corresponding to the recycling class of the waste item deposited in the receptacle in order to sort waste items by recycling class.

6. The sorting waste receptacle as recited in claim 1, further comprising a scale mounted on the frame.

7. The sorting waste receptacle as recited in claim 1, wherein the at least one sensor comprises a plurality of sensors, each of the sensors being configured for detecting a unique class of recyclable waste material.

8. The sorting waste receptacle as recited in claim 1, further comprising at least one solar panel mounted on the hollow housing.

9. The sorting waste receptacle as recited in claim 1, further comprising a smart card reader mounted in the housing for authentication of a user.

10. The sorting waste receptacle as recited in claim 1, wherein the chute has a slot defined therein, the slot being aligned with the at least one sensor.

11. A sorting waste receptacle, comprising:
   a hollow housing having a top wall, a bottom wall and at least one sidewall extending between the top wall and the bottom wall, the top wall having an opening formed therein for receiving a waste item, the housing having an upper interior portion and a lower interior portion, the lower interior portion being divided into a plurality of separate compartments;
   a frame mounted in the upper interior portion of the housing, the frame including:
      longitudinally opposed front and rear walls, the front and rear walls each having an upper end and a lower end;
      a pair of laterally opposed upper members extending between the upper ends of the front and rear walls, each of the upper members having a longitudinally extending slot defined therein; and
      a pair of laterally opposed lower members extending between the lower ends of the front and rear walls, each of the lower members having a longitudinally extending slot defined therein;
   a trolley slidably mounted in the frame, the trolley including:
      a pair of opposed upper members extending between the upper members of the frame, the upper members of the trolley slidably engaging the longitudinally extending slots defined in the upper members of the frame, the upper members of the trolley being selectively movable between the front and rear walls of the frame; and
      a pair of opposed lower members extending between the lower members of the frame, the lower members of the trolley slidably engaging the longitudinally extending slots defined in the lower members of the frame so that the lower members are selectively movable between the front and rear walls of the frame;
   a hollow chute mounted in the trolley, the chute having opposed upper and lower ends and being selectively laterally positionable in the trolley, the upper end being configured for receiving the waste item from the opening formed through the top wall of the housing, the lower end being configured for dispensing the waste item into a corresponding one of the compartments in the lower interior portion of the housing;
   at least one sensor mounted on the frame, the at least one sensor being configured for determining a recycling class of the waste item, the corresponding one of compartments being dedicated to collection of a particular class of recyclable waste items;
   at least one trolley actuator connected to the trolley for selectively moving the trolley forward and rearward between the front and rear walls of the frame;

at least one chute actuator connected to the chute for selectively moving the chute laterally in the trolley; and a controller connected to said at least one sensor, to said at least one trolley actuator, and to said at least one chute actuator, the controller being configured to drive said at least one trolley actuator to move said trolley forward and rearward in said frame and to drive said at least one chute actuator to move said chute laterally above the corresponding one of the compartments in the lower interior portion of the housing in response to a signal from said at least one sensor corresponding to the recycling class of the waste item deposited in the receptacle in order to sort waste items by recycling class.

12. The sorting waste receptacle as recited in claim 11, wherein the trolley further comprises a pair of laterally opposed sidewalls between the upper and lower members of the trolley.

13. The sorting waste receptacle as recited in claim 11, wherein said at least one trolley actuator comprises:

a frame servo motor mounted on said frame; and at least one first pivoting bar having a first end and an opposed free second end, the first end being mounted on the frame servo motor for selective pivoting of the at least one first pivoting bar, the at least one first pivoting bar having a slot defined therein, at least one of the sidewalls of said trolley having a peg extending therefrom through the slot defined in the at least one first pivoting bar;

whereby selective pivoting of the at least one first pivoting bar drives the trolley to selectively slide forward or rearward in the frame.

14. The sorting waste receptacle as recited in claim 13, wherein said at least one chute actuator comprises:

a trolley servo motor mounted on said trolley; and at least one second pivoting bar having a second free end and an opposing first end, the first end being mounted on the trolley servo motor for selective pivoting of the at least one second pivoting bar, the at least one second pivoting bar having a slot defined therein, the chute having at least one second peg extending therefrom through the slot defined in the at least one second pivoting bar;

whereby selective pivoting of the at least one second pivoting bar drives the chute to selectively slide laterally in the trolley.

15. The sorting waste receptacle as recited in claim 11, wherein the at least one sensor comprises a plurality of sensors, each of the sensors being configured for detecting a unique class of recyclable material.

16. The sorting waste receptacle as recited in claim 11, further comprising at least one solar panel mounted on the housing.

17. The sorting waste receptacle as recited in claim 11, further comprising a smart card reader for authentication of a user.

* * * * *